(12) United States Patent
Uchida

(10) Patent No.: US 11,521,312 B2
(45) Date of Patent: Dec. 6, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yumiko Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 16/375,733

(22) Filed: Apr. 4, 2019

(65) Prior Publication Data
US 2019/0333204 A1    Oct. 31, 2019

(30) Foreign Application Priority Data
Apr. 27, 2018  (JP) .............................. JP2018-087492

(51) Int. Cl.
*G06T 7/00* (2017.01)
*G06T 7/11* (2017.01)
*B23P 19/06* (2006.01)

(52) U.S. Cl.
CPC .............. *G06T 7/001* (2013.01); *B23P 19/06* (2013.01); *G06T 7/11* (2017.01); *G06T 2207/20081* (2013.01); *G06T 2207/30164* (2013.01)

(58) Field of Classification Search
None
See application file for complete search history.

(56) References Cited

U.S. PATENT DOCUMENTS

| 9,651,499 | B2* | 5/2017 | Mahuna | G01N 21/8851 |
| 10,572,993 | B2* | 2/2020 | Tanaka | G06N 5/04 |
| 2002/0159053 | A1* | 10/2002 | Nair | G01N 21/8806 |
| | | | | 356/237.2 |
| 2012/0114183 | A1* | 5/2012 | Kawaguchi | G06V 20/52 |
| | | | | 382/107 |
| 2016/0379357 | A1* | 12/2016 | Takazawa | G06T 7/0004 |
| | | | | 348/86 |

(Continued)

FOREIGN PATENT DOCUMENTS

| JP | 2007-243846 A | 9/2007 |
| JP | 2012-007985 A | 1/2012 |

(Continued)

OTHER PUBLICATIONS

Goto, et al., "Proposal for Automatic Generation System for Work Records that Uses Videos Successively Shot by Worker", Dec. 2015.

(Continued)

*Primary Examiner* — Leon Viet Q Nguyen
(74) *Attorney, Agent, or Firm* — Canon U.S.A., Inc. IP Division

(57) ABSTRACT

An image processing apparatus performs an inspection on an assembly component with use of one or more images of an assembling work, and includes a work determination unit configured to determine, from the one or more images, one or both of a start frame and an end frame of assembling work captured at a change point of the assembling work, a selection unit configured to select frames to be inspected from the one or more images based on a result of the determination by the work determination unit, and an inspection unit configured to perform an inspection on the frames selected by the selection unit.

20 Claims, 10 Drawing Sheets

(56) References Cited

U.S. PATENT DOCUMENTS

2018/0283018 A1* 10/2018 Telleria ............... B05C 11/1039
2018/0374022 A1* 12/2018 Wang ................... G06K 9/6215
2019/0219507 A1*  7/2019 Diamond ............. G06T 7/0016
2019/0283351 A1*  9/2019 Vaniglia ............. B29D 30/0061

FOREIGN PATENT DOCUMENTS

| JP | 2012-150613 A | 8/2012 |
| JP | 2013-148380 A | 8/2013 |
| JP | 2016-205836 A | 12/2016 |
| JP | 2017-134712 A | 8/2017 |

OTHER PUBLICATIONS

Ipros Corporation, "Evolved Work Analysis/Work Improvement Tool "Time Prism"", Apr. 2017.
Sugimoto, et al. "Work Assistance Camera System RICOH SC-10 Series—Birth of High-Magnification Model in Work Assistance Camera System that Uses Image Recognition to Prevent Mistakes during Work Processes", Oct. 2017.

* cited by examiner

CORRECT ANSWER IMAGE

INSPECTION TARGET AREA

FIG.3A
INSPECTION CONTENT DEFINITION

| WORK TYPE (301) | INSPECTION CONTENTS (302) | INSPECTION FRAME DEFINITION (303) | REFERENCE OBJECT (304) | INSPECTION AREA DEFINITION (305) | CORRECT ANSWER IMAGE (306) |
|---|---|---|---|---|---|
| CLEANING | — | — | — | — | — |
| SCREW FASTENING | SCREW FASTENING INSPECTION | 4 FRAMES BEFORE AND AFTER WORK END | DEVELOPING MACHINE | 100, 50, 20, 30 | |
| SHEET STICKING | SHEET STICKING INSPECTION | 8 FRAMES BEFORE AND AFTER WORK END | DEVELOPING MACHINE | 120, 70, 80, 80 | |
| ⋮ | | | | | |

FIG.3B
WORK DETERMINATION RESULT

| WORK TYPE (301) | START FRAME (307) | END FRAME (308) |
|---|---|---|
| CLEANING | Frame001 | Frame005 |
| SCREW FASTENING | Frame006 | Frame020 |
| SHEET STICKING | Frame021 | Frame040 |
| ⋮ | | |

FIG.3C
INSPECTION TARGET SELECTION RESULT

| INSPECTION CONTENTS (302) | INSPECTION TARGET CANDIDATE FRAME (309) | INSPECTION TARGET CANDIDATE AREA (310) | INSPECTION IMAGE APPROPRIATENESS DETERMINATION RESULT (311) |
|---|---|---|---|
| SCREW FASTENING INSPECTION | Frame018 | 210, 30, 20, 30 | WITH SHIELD |
| SCREW FASTENING INSPECTION | Frame019 | 210, 30, 20, 30 | WITHOUT SHIELD |
| SCREW FASTENING INSPECTION | Frame020 | 210, 30, 20, 30 | WITH SHIELD |
| SCREW FASTENING INSPECTION | Frame021 | 212, 35, 20, 30 | WITH SHIELD |
| ⋮ | | | |

FIG.3D
IMAGE INSPECTION RESULT

| INSPECTION CONTENTS (302) | IMAGE INSPECTION RESULT (312) |
|---|---|
| SCREW FASTENING | ACCEPTABLE |
| SHEET STICKING | UNACCEPTABLE |
| ⋮ | |

IMAGE PROCESSING APPARATUS, IMAGE PROCESSING METHOD, AND STORAGE MEDIUM

BACKGROUND

Field

The present disclosure relates to a technology to perform inspection using a captured image.

Description of the Related Art

Manual assembly of a product in a factory includes a number of processes and work, and a defect, such as an omission and a mistake in mounting components, may occur. Such a defect leads to a defective product. Therefore, it is necessary to perform a mounting work again in a case where the defect occurs.

As a technology to check the defect of the product, a method called image inspection, in which an inspection using image analysis is performed on an assembled product, has been practically used. In the image inspection, a correct answer image in a state where components have been correctly mounted is previously prepared, and an image of an assembled product to be inspected is collated with the correct answer image to achieve the inspection.

As an approach to determine the defect of the assembling work, a technology to determine the work defect in real time through analysis of motion of the worker has been developed. It is, however, difficult to guarantee that the assembly has been correctly completed only by the analysis of the motion of the worker. Even if the worker has performed predetermined work, a possibility of a mistake, such as the omission of a component to be mounted in the work and deviation of a mounting position, remains.

Japanese Patent Application Laid-Open No. 2013-148380 discusses an image inspection system that detects a defect of a circuit pattern on a substrate. A plurality of different inspection tasks is sequentially executed while the substrate is rotated and moved. The inspection tasks are different in coordinates of an inspection target area, specific inspection contents such as cell comparison, inspection parameters, etc. The plurality of inspection tasks are performed on a plurality of previously-determined inspection areas at previously-determined inspection timings. The plurality of inspection tasks are executed at different timings depending on a state of an inspection object. The inspection timing is controlled by an apparatus.

Japanese Patent Application Laid-Open No. 2016-205836 discusses a technology to perform an inspection of a product with use of a camera mounted on a helmet of a worker. The worker can perform the inspection of an object while performing the other assembling work unrelated to the inspection. Since there is a plurality of types of the inspection objects, imaging and an inspection corresponding to the type can be executed by reading identification information (barcode) to identify the type of the object.

For example, in a product in which a large number of components are successively mounted as with a multifunctional peripheral, a cover is often mounted in the next work after the components are mounted. Therefore, if the inspection is not performed before the completion of the assembly, an inspection whether the components have been correctly mounted cannot be performed. Further, if a defect is detected in the inspection after the all of the components are mounted, a large amount of rework, such as disassembly, is necessary. Accordingly, it is desirable to perform the inspection as early as possible after each of the components is mounted. In a case where the assembling work is manually performed, however, a time necessary for each work is not constant. Therefore, the timing suitable for the inspection of the component mounting is not fixed, accordingly it is difficult to perform image inspection during the work before the assembly is completed.

In the technology discussed in Japanese Patent Application Laid-Open No. 2013-148380, appropriate inspection timing cannot be previously designated with respect to the manual assembling work.

In the technology discussed in Japanese Patent Application Laid-Open No. 2016-205836, the inspection contents for the product are independent of the assembling work performed by the worker, and the inspection cannot be performed at timing suitable for the work carried out by the worker.

SUMMARY

Some embodiments in the present disclosure are directed to a device that performs an inspection corresponding to each component of an assembled product at appropriate timing with respect to a mounting work of each component.

Further features of various embodiments will become apparent from the following description of exemplary embodiments with reference to the attached drawings.

BRIEF DESCRIPTION OF THE DRAWINGS

FIGS. 3A to 3D each illustrate an example of a data format according to an exemplary embodiment.

DESCRIPTION OF THE EMBODIMENTS

Some exemplary embodiments are described in detail below with reference to drawings.

An image inspection system in a first exemplary embodiment includes one or more imaging devices and an analysis server that processes data transmitted from the imaging devices. In the following, the analysis server is also referred to as an image processing apparatus.

Figure 1A:
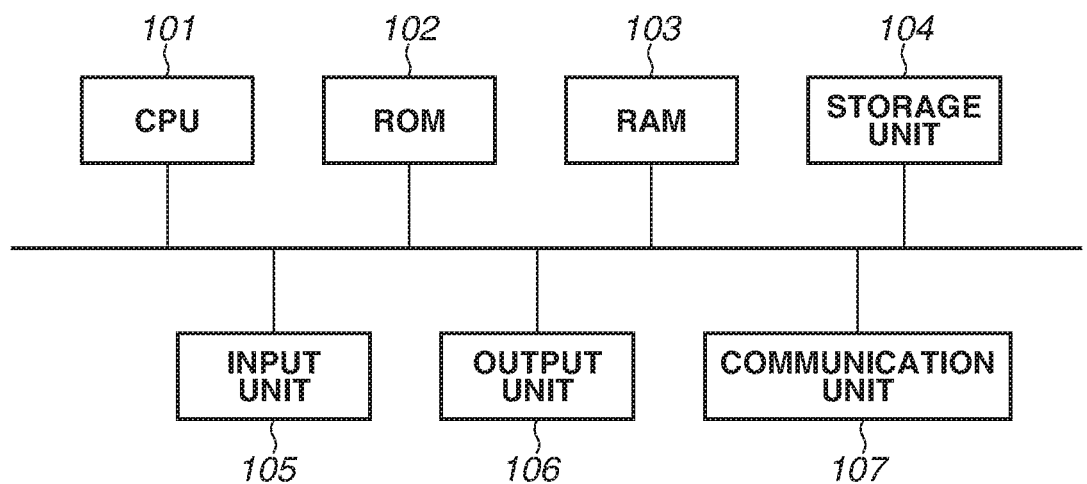
FIGS. 1A and 1B each illustrate a system configuration example according to an exemplary embodiment.

FIG. 1A is a diagram illustrating a hardware configuration of the analysis server (image processing apparatus) according to the present exemplary embodiment. A central processing unit (CPU) 101 executes a control program stored in a read-only memory (ROM) 102, thereby performing control. A random access memory (RAM) 103 temporarily stores various kinds of data provided from each of components. Further, the RAM 103 develops a program to be in a state executable by the CPU 101.

A storage unit 104 stores data to be processed according to the present exemplary embodiment, and stores data acquired from the imaging devices and an analysis result of the data. As a medium of the storage unit 104, a flash memory, a hard disk drive (HDD), a digital versatile disk (DVD)-RAM, etc. may be used. An input unit 105 includes an operation button and a touch panel, and the input unit 105 receives an instruction from a worker. An output unit 106 includes an audio speaker and a liquid crystal panel, and the output unit 106 can output data to be processed and a process result according to the present exemplary embodiment. Further, the image processing apparatus can communicate with the imaging devices, such as a monitoring camera, through a communication unit 107 and can receive captured images.

One analysis server may analyze data of one or a plurality of imaging devices. Further, the analysis sever and the imaging device may be integrally configured.

Figure 1B:
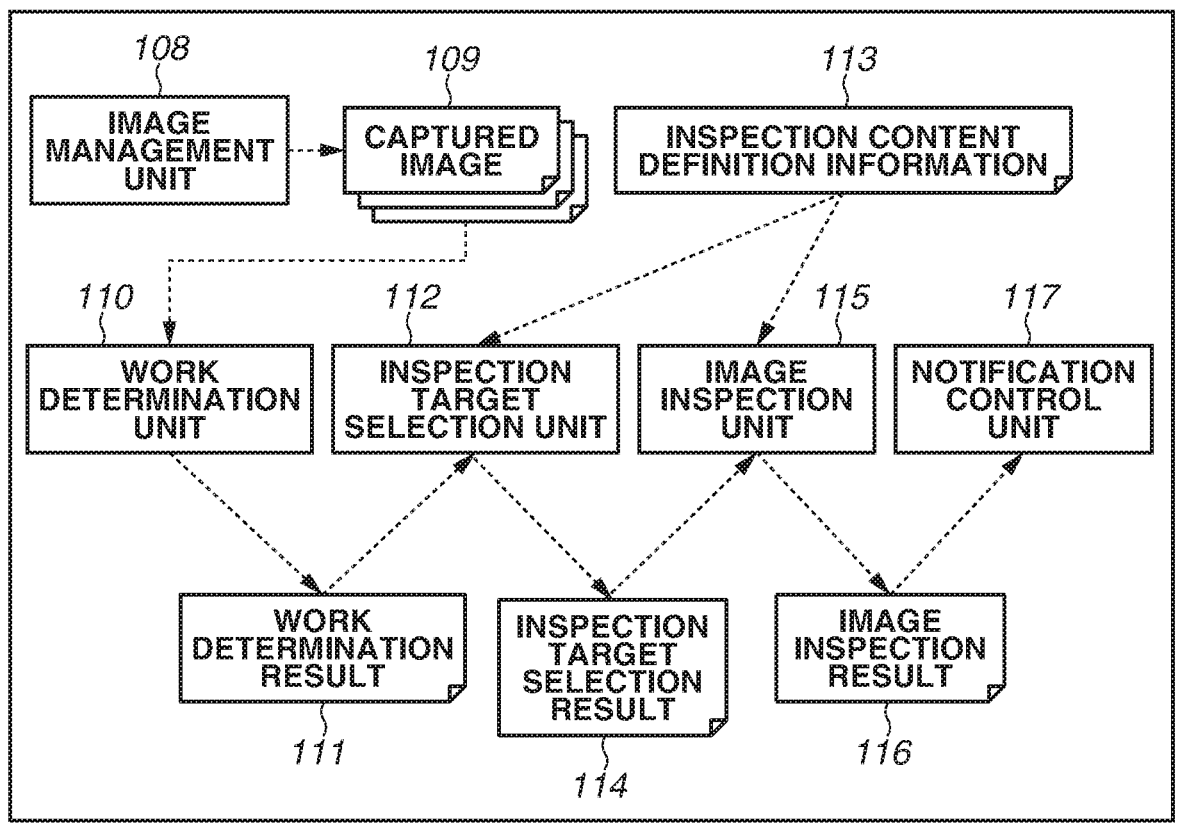

FIG. 1B is a diagram illustrating a software configuration of the system. An image management unit 108 has a function of temporally buffering images 109 captured by the imaging devices, and the image management unit 108 has a function of recording the captured images 109 in the storage unit 104. A work determination unit 110 analyzes the plurality of captured images 109 to determine a start timing and an end timing of each work, and records the start timing and the end timing as a work determination result 111 in the storage unit 104. An inspection target selection unit 112 selects images and areas on which the image inspection is to be performed, based on inspection content definition information 113 previously defined and the work determination result 111, and records a result of the selection as an inspection target selection result 114 in the storage unit 104. The inspection target selection unit 112 includes an inspection target candidate selection unit that extracts inspection target candidates from the captured images 109 and includes a final inspection target selection unit that selects a final image inspection target from the inspection target candidates.

An image inspection unit 115 performs the image inspection on the images selected as the inspection target selection result 114, and the image inspection unit 115 records a result of the image inspection as an image inspection result 116 in the storage unit 104. A notification control unit 117 makes a notification to the worker based on the image inspection result 116.

The processing corresponding to each operation in the flowcharts described in the exemplary embodiments herein may be achieved by software with use of a CPU, or the processing may be achieved by hardware without software, such as an electronic circuit.

Figure 2A:
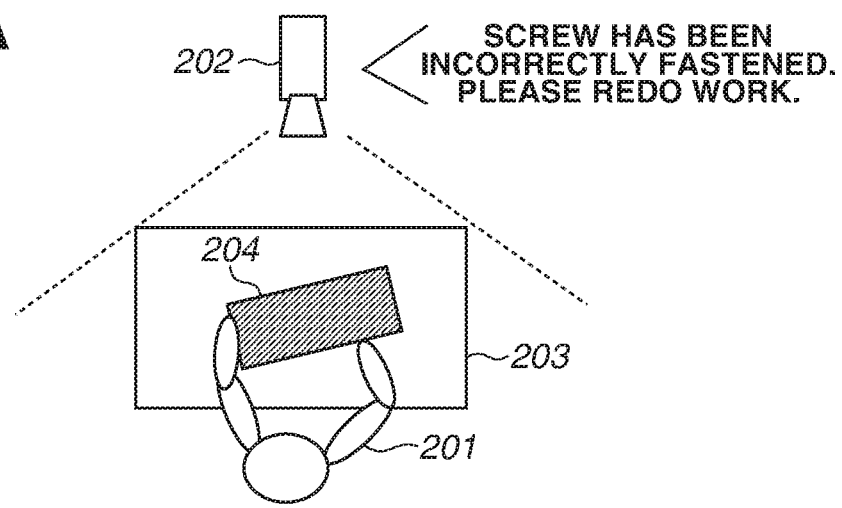
FIGS. 2A to 2E illustrate an example of a usage scene of the system and an example of a relationship between work execution and an image inspection, according to an exemplary embodiment.

FIG. 2A is a diagram illustrating a using scene of the system according to the present exemplary embodiment. In this example, a worker 201 performs assembling work on a work object 204 on a workbench 203. An imaging device 202 is installed above the workbench 203, and the imaging device 202 captures the motions of the worker 201 and the work object 204.

The system confirms whether the work object has been correctly assembled through analysis of the image captured by the imaging device 202. In a case where it is determined that there is an assembly defect, the defect is notified to the worker. For example, the defect can be notified to the worker through output of a voice saying "the screw has been incorrectly fastened. Please redo the work" using a sentence indicating the assembling contents from a speaker.

To assemble a product in a factory, a plurality of assembling works are sequentially performed on one product. The system provides a device that determines whether each work has been executed and measures an execution time. More specifically, a frame section where each work has been performed is determined through analysis of one or more motions of a person in a frame. Further, the image inspection corresponding to each assembling work is performed.

Figure 2B:
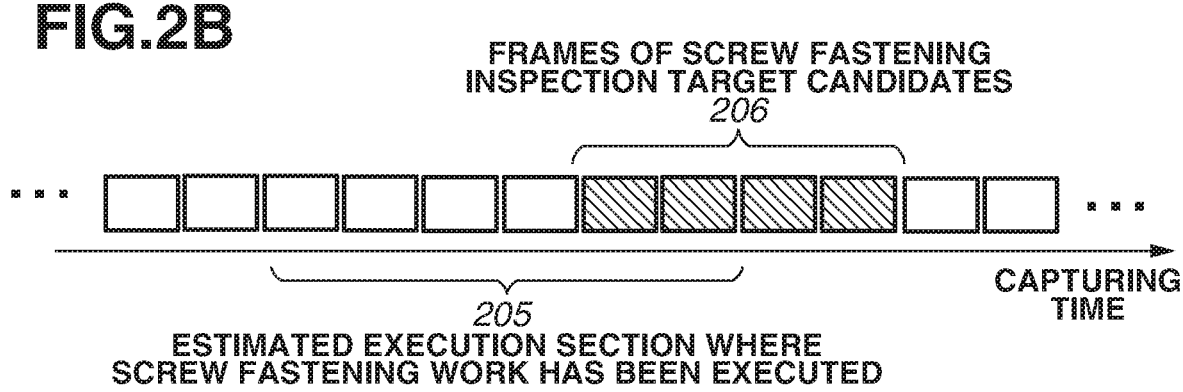

FIG. 2B illustrates a relationship between work determination and the image inspection in the system. In FIG. 2B, frames of the one or more images captured by the imaging device 202 are arranged and illustrated in order of capturing time. Frame is included in video image. In this example, it is determined that screw fastening work is performed in a section of frames 205. In the present exemplary embodiment, the image inspection is performed in order to confirm whether the screw has been fastened at a predetermined position at the completion of the screw fastening work. More specifically, an inspection whether the screw has been fastened at a predetermined position is performed with respect to frames 206 before and after the completion of the screw fastening work.

Figure 2C:
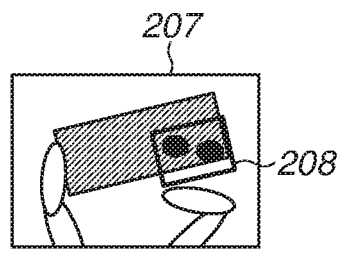

Frame 207 in FIG. 2C is extracted from frames 206. An inspection target area 208 is further selected from within the frame 207. The image of the inspection target area 208 is analyzed to determine whether the assembly has been correctly performed.

Figure 2D:
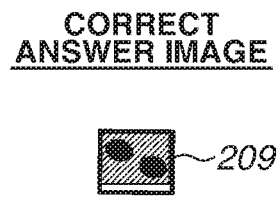

FIG. 2D illustrates a correct answer image 209 to be referred in the image inspection. The correct answer image 209 corresponds to the inspection contents and, for example, is an image in a state where the screw has been correctly fastened. In the image inspection, it can be determined whether the assembly has been correctly performed, through comparison of the image of the inspection target area 208 and the correct answer image 209.

Figure 2E:

FIG. 2E illustrates a variation of the inspection target area 208. An image of an inspection target area 210 is an image in the state where the screw has been correctly fastened, and an image of an inspection target area 211 is an image in a state where one of two screws has not been correctly fastened. When the image of the inspection target area 211 is inspected, it is determined that the screw has not been correctly fastened, and a warning is notified to the worker. As the contents of the image inspection, deviation, inclination, etc. at the mounting position may be inspected in addition to determination of the presence or absence of a mounting.

FIGS. 3A to 3D are diagrams each illustrating a format of data handled in the system. FIG. 3A illustrates the inspection content definition information 113 that defines associations of the work contents and the inspection contents and that is previously created, for example by a manager of a factory, etc.

A work type 301 is information specifying the work in the assembling process, and an inspection content 302 is information that is associated with the work and that specifies inspection contents. For example, an inspection whether a screw has been fastened may be associated with the screw fastening work. All of the work is not necessarily associated with inspections, and a plurality of inspections may be associated with one work.

An inspection frame definition 303 is definition information specifying a frame to be inspected corresponding to the inspection contents. In this example, four frames before and after the completion of the screw fastening are defined as frames to be inspected for screw fastening.

A reference object 304 and an inspection area definition 305 are information specifying the inspection target area within the frame. A position of the work object may be moved in the assembling work. Therefore, in some embodiments the inspection target area is defined by a position relative to a specific reference object. The reference object 304 is information specifying the reference object, and the inspection area definition 305 is information defining a position of the inspection target area by a position relative to the reference object 304. A correct answer image 306 is an image in a state where the component to be inspected has been correctly assembled.

FIG. 3B illustrates the work determination result 111 that is generated by the system through analysis. A start frame 307 determined as a start of the work, and an end frame 308 determined as an end of the work, are recorded for each work type 301, which allows for specifying an execution frame section in units of the work. Each of workers repeatedly performs a set of a plurality of work. Therefore, the determination result is updated at a time when one set is completed.

FIG. 3C illustrates the inspection target selection result 114 that is a result of the determination of inspection target candidate frames 309 and inspection target candidate areas 310 in the respective frames, from the captured image. Further, an inspection image appropriateness determination result 311 is stored as a result of a determination whether each of the inspection target candidate areas 310 is appropriate for an inspection image.

FIG. 3D illustrates the image inspection result 116 in which an inspection result (acceptable or unacceptable) for each inspection content is recorded.

These results of the image analysis may be separately perpetuated in a storage device as necessary. In addition, the captured images 109 themselves are stored while a frame number is assigned to each frame.

The above-described operations are described with reference to a flowchart.

Figure 4:
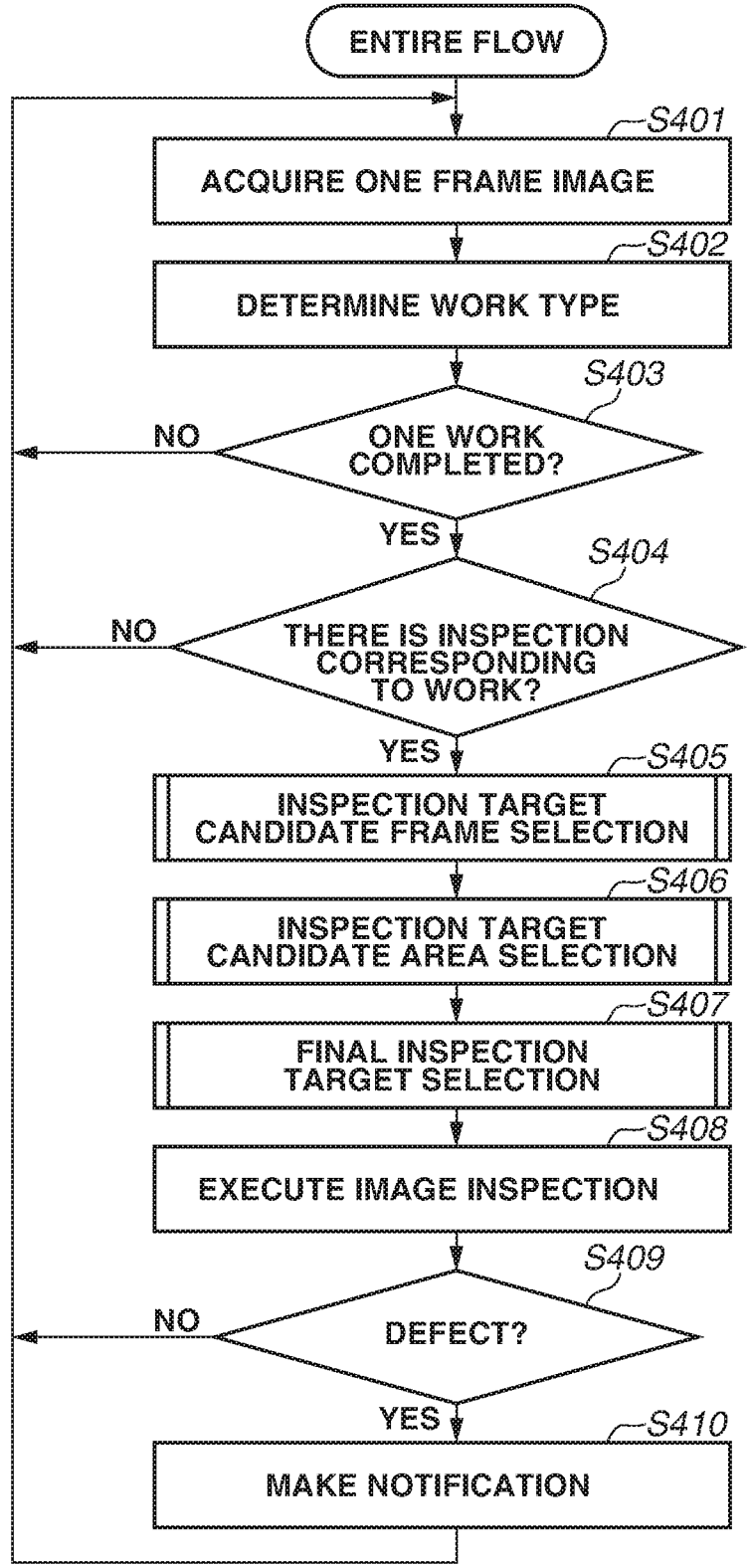
FIG. 4 is a flowchart illustrating a flow of entire processing according to a first exemplary embodiment.

FIG. 4 illustrates an outline of an entire processing flow executed by the image processing apparatus of the system. First, in S401, the oldest image is acquired from frame images that have been captured by the imaging device and accumulated in the buffer of the system. In S402, a work type is determined. At a timing that each work is first determined, the start frame 307 corresponding to the work is recorded. A method, such as machine learning, can be used for the determination of the work type. For example, data with a label indicating which work is in progress is previously prepared for each frame, and a work classifier which has learned the data is constructed. The work type can be determined for each frame by the classifier. To construct the classifier, a support vector machine (SVM), a neural network, etc. can be used.

In S403, it is determined whether one work has been completed. For example, in a case where the work determination result is different from a work determination result of a previous frame in comparison, it is determined that the work has been completed. The end frame 308 of the current work is recorded in the work determination result 111 at the timing that it is determined that one work has been completed. If it is determined that one work has been completed (YES in S403), the processing proceeds to S404, and it is determined whether there is an inspection corresponding to the work by referring to the inspection content definition information 113.

In a case where it is determined in S403 that the work has not been completed (NO in S403) or it is determined in S404 that there is no inspection corresponding to the work (NO in S404), the processing returns to S401, and the work type determination processing is repeated.

In contrast, in a case where it is determined in S404 that there is an inspection corresponding to the work (YES in S404), the processing proceeds to S405. In S405, the inspection target candidate frames are selected. Subsequently, in S406, the inspection target candidate areas are selected from the respective inspection target candidate frames.

In S407, it is determined whether the areas selected in S406 are appropriate to the inspection, and a final inspection target is selected. In S408, the image inspection is performed on the final inspection target. In S409, it is determined whether the corresponding assembling work has been correctly completed. In a case where it is determined that the assembling work has not been correctly completed (YES in S409), notification to the worker is made in S410 to prompt the worker to perform the work again. Details of the processing in S405, S406, and S407 are described below.

This flow is repeatedly performed during execution of the software, and the flow ends when execution of the software ends.

Figure 5:
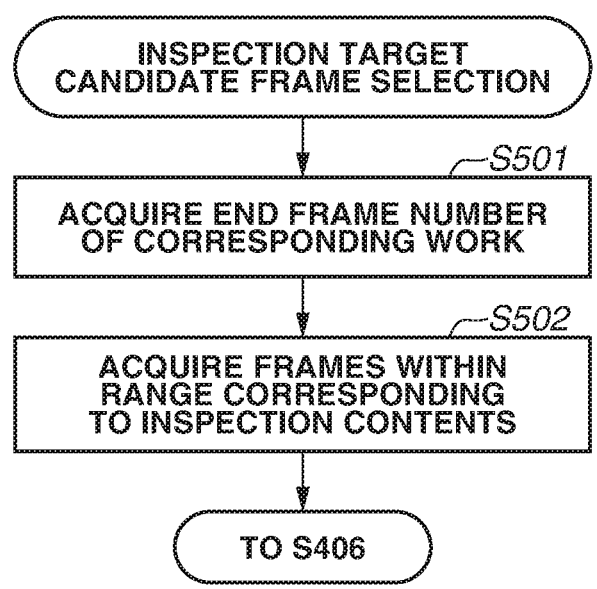
FIG. 5 is a flowchart illustrating a flow for selecting an inspection target candidate frame according to an exemplary embodiment.

FIG. 5 is a flowchart illustrating the inspection target candidate frame selection processing in S405. First, in S501, an end frame number of the target work is acquired with reference to the work determination result 111.

Next, in S502, the frames to be inspected are selected from the captured images. In this example, the frame section as the inspection target candidate is specified and the frames corresponding to the section are acquired, based on the frame number acquired in S501 and the defined contents of the inspection content definition information 113.

The method of specifying the frame section as the inspection target candidate according to the present exemplary embodiment is not limited to the above-described method. The inspection target candidate may be a frame section before the next work is started or a predetermined percentage of the section where the target inspection is executed.

Figure 6:
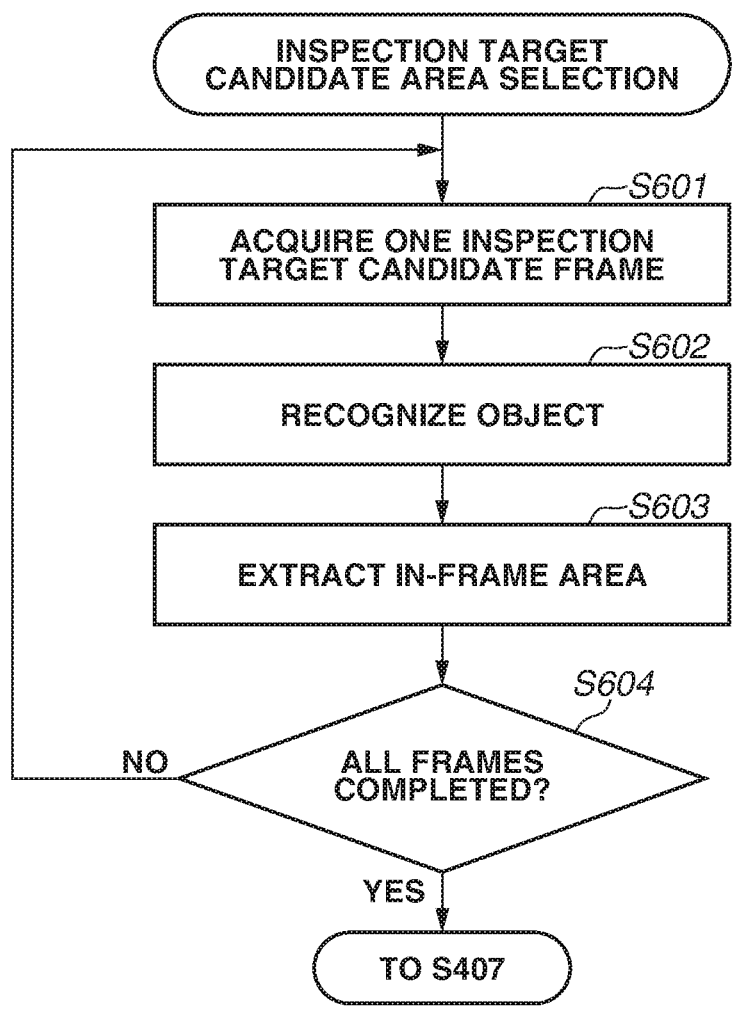
FIG. 6 is a flowchart illustrating a flow for selecting the inspection target candidate area according to an exemplary embodiment.

FIG. 6 is a flowchart illustrating processing for selecting the inspection target candidate area. In this flow, the areas to be inspected are extracted from the respective inspection target candidate frames selected in the above-described inspection processing for selecting a target candidate frame.

First, in S601, one frame is acquired from the inspection target candidate frames. Next, in S602, the frame selected in S601 is analyzed and a reference object defined by the inspection content definition information 113 is recognized. In S602, the position of the work object can be determined through template matching with reference to a template feature amount for reference object recognition that is previously defined. The template matching may be a method in which a template image is scanned on the input image to calculate a similarity at each position on the input image, and a position showing the maximum similarity (or with a similarity equal to or larger than threshold) is detected. The object recognition method according to the present exemplary embodiment is not limited to the template matching, and a method such as machine learning is also usable.

In S603, the inspection area image in the frame is extracted based on the position of the reference object recognized in S602. In S603, the inspection target area may be extracted based on the position relative to the reference object previously defined.

In sS604, it is determined whether the processing on all of the inspection target candidate frames has ended. In a case where the processing on all of the frames has ended (YES in S604), the processing in this flow ends. Otherwise (NO in S604), the processing is repeated from S601.

Figure 7:
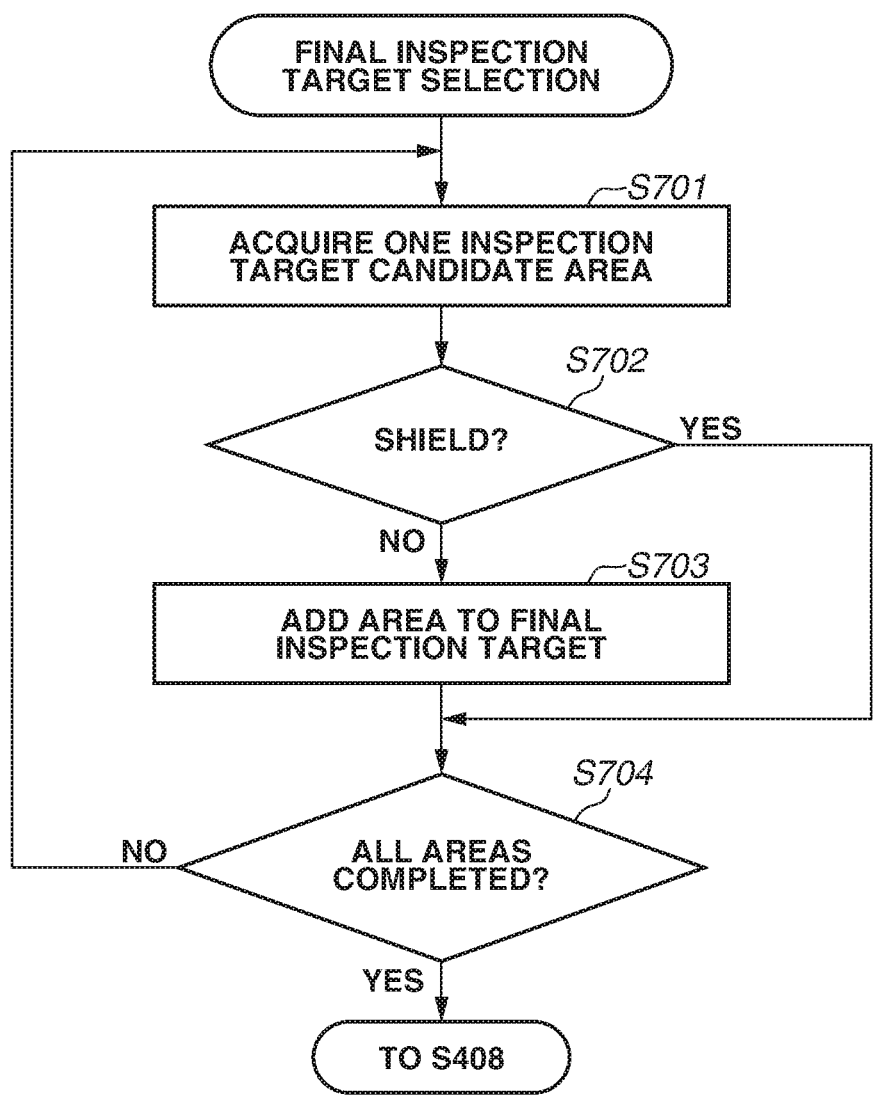
FIG. 7 is a flowchart illustrating a flow for selecting a final inspection target according to an exemplary embodiment.

FIG. 7 is a flowchart illustrating processing for selecting the final inspection target in S407. In this flow, it is determined whether the inspection target candidate selected in the flow of FIG. 6 is appropriate as the inspection image, and the image appropriate as the inspection image is selected as the final inspection target.

In S701, one area is acquired from the inspection target areas selected from the plurality of frames. In S702, the presence or absence of a shield at the inspection target position is determined to determine whether the area selected in S701 is appropriate as the inspection image. In the present exemplary embodiment, the assembling site is imaged. Therefore, the inspection target position may be shielded by a head, an arm, etc. of the worker, and the inspection target position may not be displayed depending on a frame. Accordingly, the presence or absence of a shield in the inspection target area in each frame is determined, and the inspection target area without a shield is selected.

In a case where it is determined in S702 that there is no shield (NO in S702), the currently-selected area is recorded as the final inspection target in S703. In S704, it is determined whether the determination of all of the inspection target candidate areas has been made. In a case where determination of all of the inspection target candidate areas has been made (YES in S704), the processing in this flow ends. In a case where there is an inspection target candidate area which has not been subjected to the determination (NO in S704), the processing is repeated from S701 for the inspection target candidate area which has not been subjected to the determination.

Figure 8:
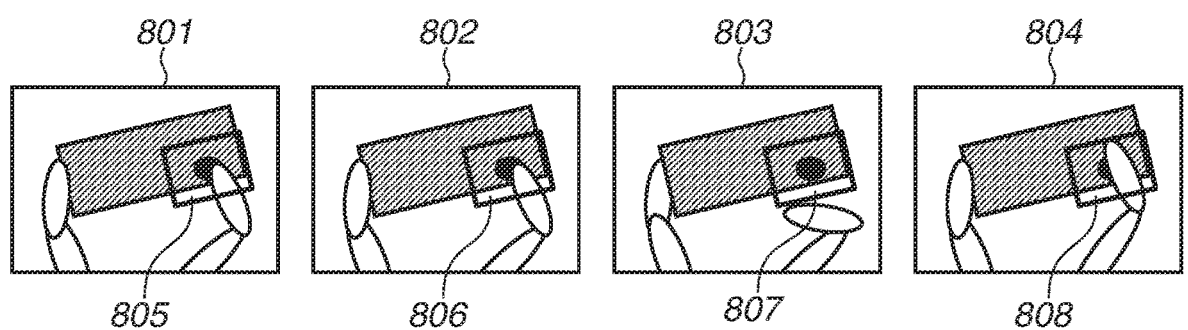
FIG. 8 is a diagram illustrating an occurrence of shielding in an area according to an exemplary embodiment.

FIG. 8 is a diagram illustrating the shield of the inspection target candidate area. FIG. 8 illustrates inspection target candidate frames 801 to 804, and inspection target candidate areas 805 to 808 are respectively set in the inspection target candidate frames 801 to 804. Among them, in each of the inspection target candidate areas 805, 806, and 808, the work object in the inspection target candidate area is shielded by the arm of the worker. When such a shield occurs, the state of the inspection object cannot be correctly recognized, and an inspection whether the assembly has been correctly completed is not accordingly performable. Therefore, in this example, the inspection target candidate area 807 is most appropriate as the inspection image and is selected as the final inspection target.

A well-known technology can be used as the shield determination method. For example, a statistic amount of color shade is compared between the inspection target candidate area and the correct answer image, and it may be determined that shield has occurred in a case where the two statistic amounts are different by a predetermined amount or more.

Further, as the other method, a range image can be used. A range sensor that can acquire a distance from an imaging object may be further installed as an imaging apparatus to acquire the range image for which a distance from the imaging apparatus is measured. A predetermined distance is previously determined based on an installation position of the work object. In a case where there is an object which is nearer to the imaging apparatus than the predetermined distance, it can be determined that the shield occurs.

Alternatively, a contour of an object is extracted from each of the inspection target candidate area and the correct answer image. In a case where the contour present in the correct answer image is lacking in the inspection target candidate area, it may be determined that the shield occurs.

The processing for selecting the final inspection target according to the present exemplary embodiment is not limited to the determination of a presence or absence of the shield. The final inspection target may be selected in consideration of the presence or absence of fog, blur, etc. of the captured area.

After the final inspection target is selected in the flow of FIG. 7, the image inspection is performed in S408. In the image inspection, the final inspection target area and the correct answer image in the state where the component has been correctly mounted are compared to determine whether the component has been correctly mounted in the inspection target. A well-known technology can be used as the method of the image inspection. For example, a difference from the correct answer image is calculated, and it is determined as acceptable when the difference is equal to or lower than a predetermined value, and it is determined as unacceptable when the difference is larger than the predetermined value.

In a case where there is a plurality of final inspection targets, the determination may be made based on majority of the inspection results, or it may be determined as acceptable when there are one or more acceptable images.

The contents and the method of the image inspection according to the present exemplary embodiment are not limited thereto. The inspection contents, correctness of inclination, color shade, etc. of the mounting may be determined, in addition to the determination of the presence or absence of the component mounting.

Further, in a case where there is no inspection target candidate area appropriate for the inspection in the final inspection target selection processing, a notification may be made to the worker to instruct the worker to remove a shielding object. In this case, the inspection can be completed by performing processing in S405 to S410 on images captured after the shielding object is removed.

According to the present exemplary embodiment, it is possible to appropriately determine the inspection timing and the inspection target area of the assembled product based on the assembling work in the factory. This eliminates interrupting the work only for inspection of the assembled product. Further, since the time from completion of the work to the inspection is short, it is possible to reduce rework when the defect occurs. Further, since the inspection can be executed during the assembling work, a state inside the product that cannot be inspected after completion of the whole assembly can be inspected.

A work unit corresponding to the work according to the present exemplary embodiment can be freely determined by a manager of the factory. The unit may be an operation to mount one component, or operations to mount a plurality of components may be collected as one work.

A second exemplary embodiment is described below. A description of the configurations that are the same as the configurations according to the first exemplary embodiment is omitted.

In the first exemplary embodiment, the imaging is performed at the constant frame rate. However, the work in the assembling process may be performed at an extremely high speed, and the image without shield may not be captured at a time that the inspection is to be performed, if the imaging is carried out at the constant frame rate. In contrast, if the imaging is performed constantly at a high frame rate, a load on the system is increased. In the present exemplary embodiment, a unit configured to change the frame rate of the imaging device is provided, and the frame rate is increased only when inspection timing comes near.

Figure 9:
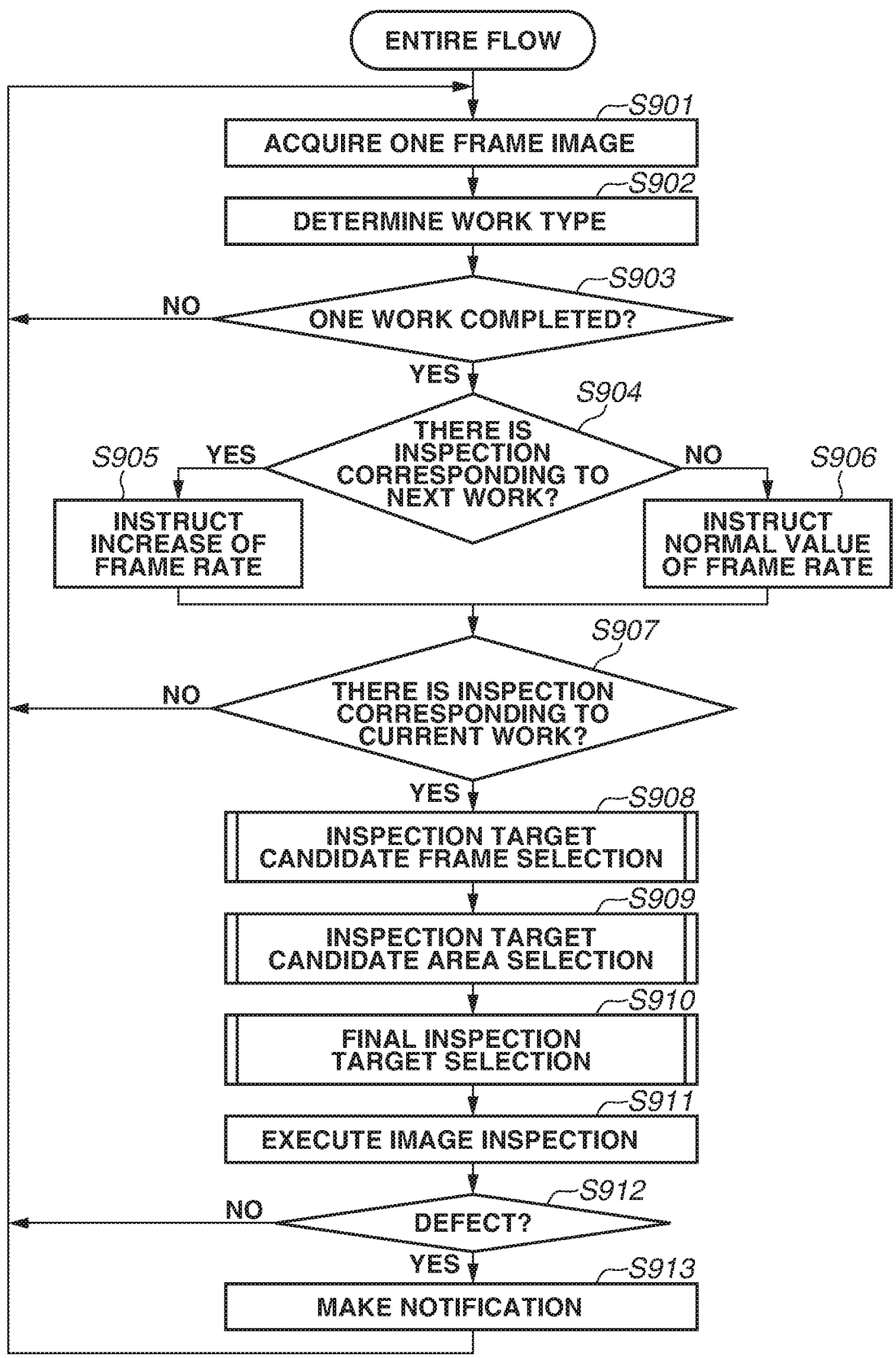
FIG. 9 is a flowchart illustrating a flow of entire processing according to a second exemplary embodiment.

FIG. 9 illustrates a flow outline of the processing executed by the image processing apparatus of the system according to the second exemplary embodiment. The processing in S901 to S903 and in S908 to S913 are the same as or similar to the processing in S401 to S403 and in S405 to S410 in FIG. 4 according to the first exemplary embodiment. First, in S901, the oldest image is acquired from frame images that have been captured by the imaging device and accumulated in the buffer of the system. In S902, the work type is determined. In S903, it is determined whether one work has been completed.

When it is determined that one work has been completed (YES in S903), the processing proceeds to S904, and it is determined whether there is an inspection corresponding to "work next to the completed work". If it is determined in S904 that there is an inspection corresponding to the next work (YES in S904), the processing proceeds to S905, and an instruction to increase the frame rate is issued to the imaging device. In contrast, if it is determined in S904 that there is no inspection corresponding to the next work (NO in S904), the processing proceeds to S906, and the frame rate is set to a normal value.

Next, the processing proceeds to S907, and it is determined whether there is an inspection corresponding to the work, the completion of which has been determined in S903. In a case where it is determined in S907 that there is a corresponding inspection (YES in S907), the processing proceeds to S908, and the processing for selecting the inspection target candidate frames is performed. The processing in and after S908 are the same as or similar to the processing in the first exemplary embodiment.

This flow is repeated to perform the imaging control in which the frame rate is made higher than the frame rate in the normal state in the case where there is an inspection corresponding to the next work, and otherwise, the frame rate is returned to the frame rate in the normal state. This makes it possible to increase the frame rate only near the inspection timing.

Although the image inspection is executed immediately after the execution of the work ends in the present exemplary embodiment, the configuration is not limited thereto, and the inspection timing may be delayed in consideration of a calculation load on the system.

For example, when a cover is mounted after five works from the screw fastening work, even if the determination of the screw fastening is performed before the cover mounting work, the screw fastening work is performable again without rework to detach the cover. As described above, the inspection execution timing may be previously designated by the manager of the factory, and the inspection may be controlled to be performed before the designated timing. For example, since the processing load is high while the frame rate of the imaging is increased in the present exemplary embodiment, performing the image inspection in the other section makes it possible to smooth the load on the system.

Other Embodiments

Some other exemplary embodiments are described below. Description of the configurations same as the configurations according to the first exemplary embodiment is omitted.

The work execution determination method according to the first and second exemplary embodiments sequentially determines the work type for each frame. The work execution determination method according to some exemplary embodiments, however, is not limited to this. For example, a change point after the plurality of works have been completed may be detected in one process, and the work execution determination may be performed collectively on the plurality of works.

In these exemplary embodiments, a group of the plurality of works for the work execution determination is defined as a "phase". To enable the system to recognize the change point of the phase, the phase is changed at a time that the position of the object is changed. For example, in a case where it is known that there is movement to reverse and rotate the work object 204 between works 4 and 5 and between works 6 and 7 in the process of works 1 to 9, three phases of works 1 to 4, works 5 and 6, and works 7 to 9 can be defined.

The execution determination of the work in the phase and the image inspection are performed at the change point of the phase, and notification is made in a case where a defect is detected. In the above-described example, determination and an inspection for the works 1 to 4 are performed when the phase is changed from the first phase to the second phase.

Figure 10:
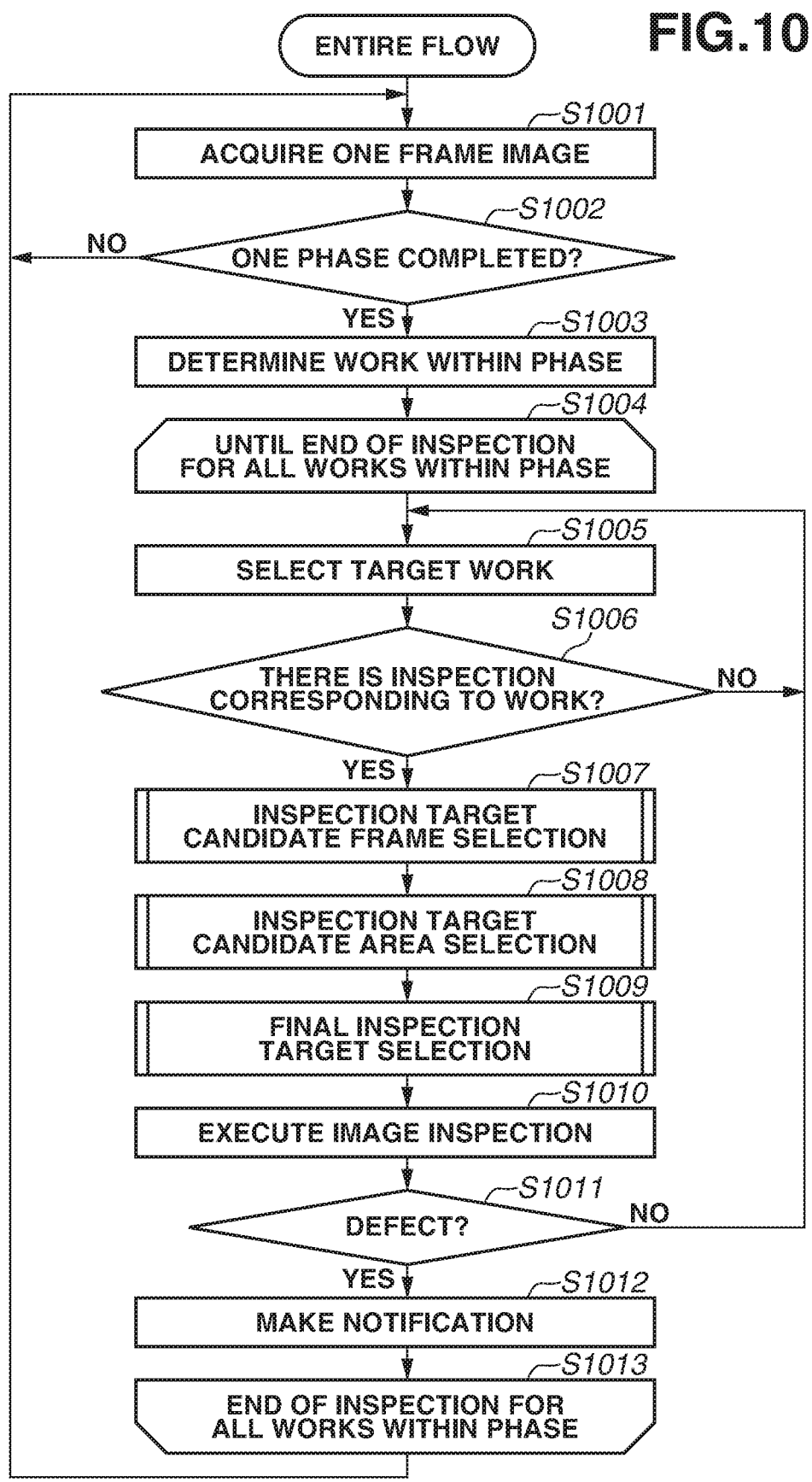
FIG. 10 is a flowchart illustrating a flow of entire processing according to another exemplary embodiment.

FIG. 10 illustrates an example embodiment of a flow outline of entire processing executed by the image processing apparatus of the system when the work execution determination is made for each phase. Processing in S1007 to S1012 is the same as or similar to processing in S405 to S410 in FIG. 4 according to the first exemplary embodiment.

First, in S1001, the oldest image is acquired from the frame images that have been captured by the imaging device and accumulated in the buffer of the system. In S1002, it is determined whether one phase has been completed. In S1002, the presence or absence of a positional change of the work object can be determined through template matching with reference to a template feature amount in a phase change that is previously defined. A phase start determination method according to the present exemplary embodiment is not limited to this method, and a method such as machine learning is also usable. Processing in S1001 and S1002 is repeatedly performed until it is determined that the phase has been completed.

As a specific algorism for the machine learning, for example a most neighborhood method, a naïve B ayes method, a decision tree method, and a support vector machine, may be used. Further, a deep learning that uses a neural network to generate a feature amount for learning and a coupling weighting factor by itself may be also used.

In S1003, execution of the work in the phase is determined. For example, a frame and the work which has been performed can be determined by analyzing the temporal change of the feature amount for each frame within the phase and the change of a passing position of a hand of the worker displayed in the frame. In S1003, the start frame 307 and the end frame 308 of the work are determined for the plurality of works within the phase and are recorded.

In S1004 to S1013, the processing is repeated for each work in the phase. First, in S1005, one work is selected from the work in the phase. In S1006, it is determined whether there is an inspection corresponding to the selected work. In a case where there is no corresponding inspection (NO in S1006), the processing returns to S1005, and the processing is repeated.

In S1007 to S1012, the inspection target candidate frames, the inspection target candidate areas, and the final inspection target are selected, the image inspection is executed, and a defect is notified, in a manner that is the same as or similar to S405 to S410 in FIG. 4. The above-described processing is repeated for the number of works within the phase. In a case where it is determined in S1013 that the inspection of all of the works in the phase has been completed, the processing returns to S1001.

As described above, the work determination is collectively performed on the frames within the phase, and the work execution determination can be made in consideration of a relationship before and after the work and of the temporal change of the motion of the worker.

The processing by the work determination unit, the image inspection unit, etc. among the above-described processing units may be performed by a learnt model that has performed machine learning, in place of the processing units. In this case, for example, a plurality of combinations of input data and output data for the processing units is prepared as learning data, and the learnt model is created and acquires knowledge from the leaning data through machine learning and outputs, as a result, output data corresponding to input data based on the acquired knowledge. The learnt model can be configured by, for example, a neural network model. Further, the learnt model operates as a program to perform processing equivalent to the processing by the above-described processing units in cooperation with a CPU, a graphics processing unit (GPU), etc., thereby performing the processing of the processing units. The above-described learnt model may be updated after predetermined processing, as necessary.

Some embodiments are achieved by supplying software (program) achieving the functions of the above-described exemplary embodiments to a system or an apparatus through a network or various kinds of storage media, and causing a computer (or CPU, micro processing unit (MPU), etc.) of the system or the apparatus to read out and execute the program.

According to these exemplary embodiments, it is possible to inspect mounting of a component in an assembled product at appropriate timing.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-087492, which was filed on Apr. 27, 2018 and which is hereby incorporated by reference herein in its entirety.

What is claimed is:

1. An image processing apparatus comprising:
one or more processors programmed to cause the image processing apparatus to function as:
a determination unit configured to determine, based on a recognized action of a worker performing assembly operation for a product from a captured moving image, a change point of the moving image corresponding to a change of the action of assembly operation, wherein the change point is determined by at least one of an end frame of a first section of the moving image that captures an action of a first assembly operation and a start frame of a second section of the moving image that captures an action of a second assembly operation following the first assembly operation;
a selection unit configured to select a predetermined number of frames before and after the change point between the first assembly operation and the second assembly operation; and
an inspection unit configured to inspect the result of the first assembly operation before a predetermined third assembly operation is performed for the assembly operation, based on the frames selected by the selection unit.

2. The image processing apparatus according to claim 1, wherein the selection unit selects a candidate area to be inspected in the selected frames.

3. The image processing apparatus according to claim 1, wherein the determination unit determines one or both of a respective start frame and a respective end frame for each of the action of the first assembly operation and the action of the second assembly operation.

4. The image processing apparatus according to claim 1, wherein the selection unit determines a presence or absence of a shield in each of candidate areas to be inspected, and selects frames showing less of the shield as the selected frames.

5. The image processing apparatus according to claim 1, wherein the selection unit further includes a notification unit configured to make a notification in a case where there is no selected frame.

6. The image processing apparatus according to claim 1, further comprising an imaging control unit configured to control an imaging apparatus to change a frame rate based on the determination of the change point.

7. The image processing apparatus according to claim 1, further comprising a notification unit configured to, in a case where the inspection unit has found a defect in the result of the first assembly, make a notification of the defect before the third assembly operation is completed.

8. The image processing apparatus according to claim 1, wherein the moving image includes a plurality of change points, and each of the change points corresponds to a respective change of the action of assembly operation.

9. The image processing apparatus according to claim 1, wherein an action of the worker performing the third assembly operation is a sheet sticking or a cover closing.

10. The image processing apparatus according to claim 1, wherein the first section of the moving image includes a respective plurality of frames, and
wherein the second section of the moving image includes a respective plurality of frames.

11. The image processing apparatus according to claim 10,
wherein the worker performs the first assembly operation,
wherein the worker performs the second assembly operation, and
wherein the first assembly operation is different from the second assembly operation.

12. The image processing apparatus according to claim 10, wherein the predetermined number of frames before and after the change point includes a first predetermined number of frames before the change point and a second predetermined number of frames after the change point.

13. An image processing method comprising:
determining, based on a recognized action of a worker performing assembly operation for a product from a captured image, a change point of the moving image corresponding to a change of the action of assembly operation, wherein the change point is determined by at least one of an end frame of a first section of the moving image that captures an action of a first assembly operation and a start frame of a second section of the moving image that captures an action of a second assembly operation following the first assembly operation;
selecting a predetermined number of frames before and after the change point between the first assembly operation and the second assembly operation; and
inspecting the result of the first assembly operation before a predetermined third assembly operation is performed for the assembly operation, based on the selected frames.

14. The image processing method according to claim 13, wherein the determination is made through machine learning.

15. The image processing method according to claim 13, wherein the inspection is performed through machine learning.

16. The image processing method according to claim 13, wherein the action of the first assembly operation or the action of the second assembly operation is screw fastening.

17. The image processing method according to claim 13,
wherein the first section of the moving image includes a respective plurality of frames, and
wherein the second section of the moving image includes a respective plurality of frames.

18. The image processing method according to claim 17,
wherein the worker performs the first assembly operation,
wherein the worker performs the second assembly operation, and
wherein the first assembly operation is different from the second assembly operation.

19. The image processing method according to claim 17, wherein the predetermined number of frames before and after the change point includes a first predetermined number of frames before the change point and a second predetermined number of frames after the change point.

20. A non-transitory computer-readable storage medium storing a computer-executable program for causing a computer to perform a method comprising:
determining, based on a recognized action of a worker performing assembly operation for a product from a captured moving image, a change point of the moving image corresponding to a change of the action of assembly operation, wherein the change point is determined by at least one of an end frame of a first section of the moving image that captures an action of a first assembly operation and a start frame of a second section of the moving image that captures an action of a second assembly operation following the first assembly operation;
selecting a predetermined number of frames before and after the change point between the first assembly operation and the second assembly operation; and
inspecting the result of the first assembly operation before a predetermined third assembly operation is performed for the assembly operation, based on the selected frames.

* * * * *